United States Patent
Jones et al.

(10) Patent No.: US 7,523,412 B2
(45) Date of Patent: Apr. 21, 2009

(54) METHOD AND SYSTEM FOR PROVIDING A SCROLL-BAR POP-UP WITH QUICK FIND FOR RAPID ACCESS OF SORTED LIST DATA

(75) Inventors: Doris L. Jones, Somerville, MA (US); Ebubechukwu I. Okafor, Mattapan, MA (US); Latoya Sankey, Maiden, MA (US); Razeyah Stephen, Marlboro, MA (US); Angelo Lynn, Boston, MA (US); Chenita D. Daughtry, Roxbury, MA (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 11/616,062

(22) Filed: Dec. 26, 2006

(65) Prior Publication Data

US 2008/0155464 A1    Jun. 26, 2008

(51) Int. Cl.
    *G06F 3/048*    (2006.01)
(52) U.S. Cl. .................................. 715/787
(58) Field of Classification Search ................ 715/784, 715/785, 786, 787
    See application file for complete search history.

(56) References Cited

U.S. PATENT DOCUMENTS

| | | | |
|---|---|---|---|
| 6,204,846 B1 * | 3/2001 | Little et al. | 715/784 |
| 6,430,574 B1 | 8/2002 | Stead | |
| 6,734,883 B1 * | 5/2004 | Wynn et al. | 715/830 |
| 6,738,084 B1 | 5/2004 | Kelley et al. | |
| 6,778,192 B2 | 8/2004 | Arbab et al. | |
| 6,816,174 B2 | 11/2004 | Tiongson et al. | |
| 6,882,354 B1 | 4/2005 | Nielsen | |
| 7,117,450 B1 | 10/2006 | Chaudhri | |
| 2002/0186252 A1 | 12/2002 | Himmel et al. | |

(Continued)

FOREIGN PATENT DOCUMENTS

EP    0585192 A1    3/1994

*Primary Examiner*—Thanh T Vu
(74) *Attorney, Agent, or Firm*—David A. Dagg

(57) ABSTRACT

A pop-up window is generated when the user clicks on the slider within the scroll bar display object. The pop-up window displays information from one or more categories in a currently selected list entry, including the category on which the list is currently sorted. As the user moves the slider, the information in the pop-window is updated to reflect the current location in the list, as determined by the current location of slider within the scroll bar. When the user stops scrolling, i.e. releases the scroll slider, the matching entry for the current location becomes highlighted, and the system enters a search mode. In the search mode, the disclosed system continues to display the pop-up window for a few seconds to allow the user the option of editing the text in the pop-up (as derived from the current position in the list) in order to go to another entry in the sorted list. Accordingly, the sorted category information loaded from the current list entry becomes editable within the pop-up window with a type ahead feature allowing the user to see and select from and search based on information from list entries in the sorted data that closely match the text that the user has typed into the pop-up window. When the user presses "Enter", the current view and scroll bar position are relocated to reflect the position of the entry matching the selected search information.

16 Claims, 8 Drawing Sheets

U.S. PATENT DOCUMENTS

2005/0091604 A1  4/2005  Davis
2005/0210403 A1  9/2005  Satanek
2006/0184901 A1  8/2006  Dietz

* cited by examiner

| ^ | Who ▲ | ^ | Date v | Time | Size v | Subject ^ |
|---|---|---|---|---|---|---|
| ★ | Frank B | | 04/07/2004 | 09:53 AM | 2,373 | Fw: he's in trouble... |
| ★ | Frank B | | 04/06/2004 | 05:19 PM | 2,380 | Dev bring up instructions |
| ★ | Frank B | | 04/03/2004 | 03:09 PM | 4,374 | Devloper install instructions |
| ★ | Frank L | | 10/08/2003 | 04:30 AM | 12,560 | Answers>RE:Fw: New locale related SPRs |
| ★ | Frank P | | 09/22/2005 | 10:20 AM | 11,726 | Fw: Patch for infinite loop bug in WMC when creating a meeting <coming soon> |
| ★ | Frank P | | 07/29/2005 | 12:11 PM | 10,748 | Re: dev tool suggestion |
| ★ | Frank P | | 06/14/2005 | 02:30 PM | 10,574 | Patch for Joyce winner from AR or the 06/03 Rich Client build) |
| ★ | Frank P | | 06/03/2005 | 05:50 PM | 2,710 | Re: Please respond <more> |

Entry Info 86

Current Position for Who: Don W
Subject: Need one more step
Dated 04/03/2004

Pop up 84

Entries 82

Current View 80

FIG. 4

|   | Who ▲ |   | Date v | Time | Size v | Subject ^ |
|---|---|---|---|---|---|---|
|   | Don W |   | 04/07/2004 | 09:53 AM | 2,373 | PerProd 4/6 install instructions |
|   | Don W |   | 04/06/2004 | 05:19 PM | 2,380 | PerProd 4/5 Dev bring |
|   | Don W |   | 04/03/2004 | 03:09 PM | 4,374 | Need one more step |
|   | Don W |   | 10/08/2003 | 04:30 AM | 12,560 | Answers>RE:Fw: New locale related SPRs |
|   | Don W |   | 09/22/2005 | 10:20 AM | 11,726 | Fw: Patch for infinite loop bug in WMC when creating a meeting <coming soon> |
|   | Don W |   | 07/29/2005 | 12:11 PM | 10,748 | Re: dev tool suggestion |
|   | Don W |   | 06/14/2005 | 02:30 PM | 10,574 | Re: Versioning features and plugins |
| ★ | Don W |   | 06/03/2005 | 05:50 PM | 2,710 | Patch for Joyce winner from AR or the 06/03 Rich Client build) |
|   | Don W |   | 11/25/2002 | 02:36 PM | 4,757 | Re: Please respond <more> |
| ★ | Don W |   | 11/30/2001 | 06:58 PM | 1,099 | State Change Notification, now Pending/Indirectly Fixed |
| ★ | Don W |   | 10/08/2002 | 01:24 PM | 13,728 | Fw: N/D Ship Party – PLEASE RESPOND TO INVITE BY TODAY. Thank you |
| ★ | Donald R |   | 07/21/2005 | 02:12 PM | 25,403 | IMPORTANT INFO: Managers' IP Training Database - Confirming Attendance |
| ★ | Donald R |   | 01/24/2002 | 10:57 AM | 1,389 | mail question |
| ★ | Donald R |   | 07/23/2001 | 03:24 PM | 7,923 | Status on the Bans account |
| ★ | Donna S |   | 02/08/2006 | 01:59 PM | 1,604 | The following SPR has been assigned to you: |

Pop up 84: Current Position for Who: Don W / Subject: Need one more step / Dated 04/03/2004 ← 92

FIG. 5

METHOD AND SYSTEM FOR PROVIDING A SCROLL-BAR POP-UP WITH QUICK FIND FOR RAPID ACCESS OF SORTED LIST DATA

FIELD OF THE INVENTION

The present invention relates generally to computer user interface systems for accessing sorted lists of data, and more specifically to a method and system for providing a scroll bar pop-up window with quick find capabilities for rapid access of sorted list data.

BACKGROUND OF THE INVENTION

As it is generally known, many computer application programs operate at least in part by providing users with access to sorted list data. For example, electronic mail systems ("e-mail") typically include mailbox structures (e.g. "Inbox", etc.) containing lists of e-mail messages. In any application having an abundance of list data, there can be a performance degradation when scrolling through a list. One known solution for searching sorted list data is by performing a complex search operation. However, such an approach has significant drawbacks, including slow response time for obtaining search results.

Some existing systems have specifically provided the user with pop-up information consisting of date information for list entries while the user is scrolling through a list. These existing solutions have no capabilities for responding to and/or viewing other type of list entry category information, on which the list may in fact have been sorted. Additionally, such existing systems provide the user with no ability to modify the displayed date information in order to quickly perform any kind of search over the sorted list data.

Other existing systems, (e.g. the Web-based email application Gmail® provided by Google®), have included a pop-up window displaying the name of the author of a next thread in an on-line conversation. These existing systems also fail to provide any other list entry category information, regardless of how the list has been sorted, and include no ability to modify displayed pop-up information in order to quickly perform a search over the listed data.

For the above reasons, it would be desirable to have a new system for providing pop-up information when a user is scrolling through list data using a scroll bar. The new system should display relevant list entry category information beyond list entry dates, and enable a user to modify displayed data to quickly perform a search over the list data.

SUMMARY OF THE INVENTION

In order to address the above described and other shortcomings of existing systems, a new method and system for providing a scroll-bar pop-up is disclosed that provides a user with a way to easily navigate through a sorted list, and to conveniently initiate a search operation across the currently sorted data in the list.

In the disclosed system, a pop-up window is generated when the user clicks on the slider within a scroll bar display object. The pop-up window displays information from one or more categories in a currently selected list entry, including the category on which the list is currently sorted. As the user moves the slider, the information in the pop-window is updated to reflect the current location in the list, as determined by the current location of slider within the scroll bar.

When the user stops scrolling, i.e. releases the scroll slider, the matching entry for the current location is highlighted, and the disclosed system enters a search mode. In the search mode, the disclosed system continues to display the pop-up window for a short time (e.g. a few seconds) to allow the user the option of editing the text in the pop-up, as derived from the entry at the current position in the list, in order to go to another entry in the list. Accordingly, the disclosed system makes the sorted category information loaded from the current list entry editable within the pop-up window. The search mode operation of the pop-up window provided by the disclosed system further includes a type ahead feature, allowing the user to see and select from information from list entries in the sorted data (e.g. in a drop down list or the like), that closely match the text that the user has typed into the pop-up window. When the user presses "Enter", the current view and scroll bar position are relocated to a position of the entry matching the selected search information within the sorted list.

Thus there is disclosed a new system for providing pop-up information when a user is scrolling through list data using a scroll bar. The new system displays a variety of relevant list entry category information, including information from the category on which the list is sorted, and enables a user to conveniently modify sorted category information in the pop-up to quickly perform a search over the list data.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 4 is a screen shot showing another example of a current view of a sorted list of entries that is user navigable using a scroll bar user interface display object, following the user moving the slider portion of the scroll bar user interface display object;

FIG. 5 is a screen shot showing another example of a current view of sorted list of entries that is user navigable using a scroll bar user interface object, following the user releasing the slider in the scroll bar user interface display object;

DETAILED DESCRIPTION OF EXEMPLARY EMBODIMENTS

Figure 1:
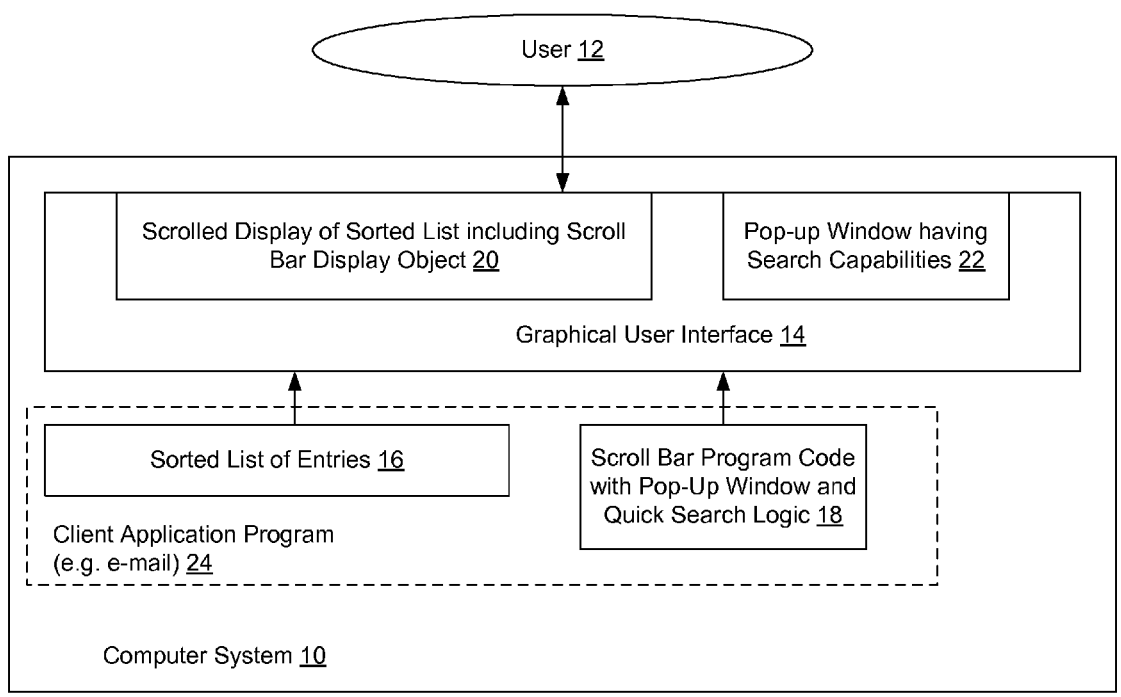
FIG. 1 is a block diagram showing components in an illustrative embodiment of the disclosed system.

FIG. 1 is a block diagram showing components in an illustrative embodiment of the disclosed system. As shown in FIG. 1, a client computer system 10 associated with a User 12 operates to provide a Graphical User Interface 14 to the User 12. A Client Application Program 24 executing on the Computer System 10 is shown including a Sorted List of Entries 16, and a Scroll Bar Program Code with Pop-Up Window and Quick Search Logic 18. Execution of the Client Application Program 24 provides portions of the Graphical User Interface 14, such as a Scrolled Display of the Sorted List of Entries including a Scroll Bar Display Object 16, and a Pop-up Window having Search Capabilities 22. The Graphical User Interface 14 may be any specific type of interactive user interface. The Graphical User Interface 14 may be navigated using any specific type of user interface device provide as part of the Computer System 10, such as a computer keyboard or mouse, and/or using voice commands or the like.

The Client Application Program 24 may be any specific kind of program that displays a sorted list of entries to a user, such as an electronic mail ("e-mail") application program, an interface to a database or file system, etc. The Sorted List of Entries 16 may be made up of any specific type of entries, such as e-mail messages, files, etc. The Sorted List of Entries 16 is sorted by one of a number of information categories selected by the User 12.

The Computer System 10 may include at least one processor, program storage, such as memory and/or another computer readable medium, for storing program code (e.g. the Scroll Bar Program Code with Pop-up Window and Quick Search Logic 18) executable on the processor, and for storing data operated on by such program code (e.g. Sorted List of Entries 16). The Computer System 10 may further include one or more input/output devices and/or interfaces, such as data communication and/or peripheral devices and/or interfaces. The Computer System 10 may further include appropriate operating system software.

Figure 2:
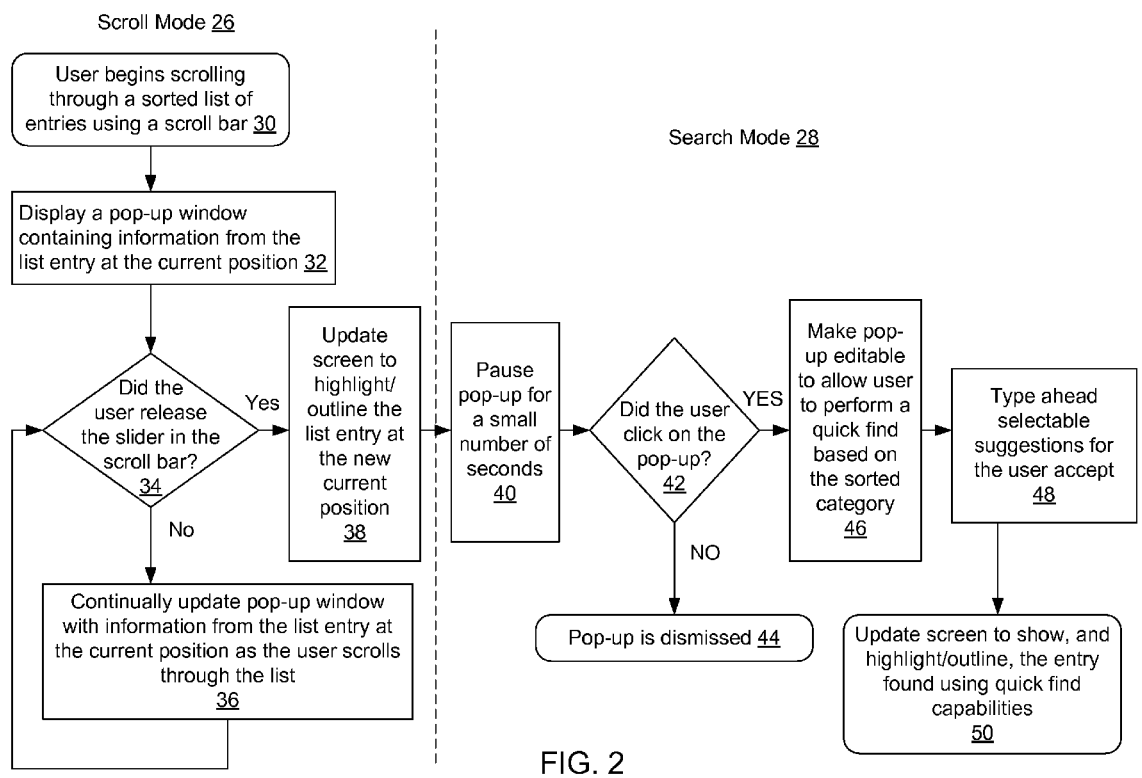
FIG. 2 is a flow chart showing steps performed during operation of an illustrative embodiment of the disclosed system.

FIG. 2 is a flow chart showing steps performed during operation of an illustrative embodiment of the disclosed system. The steps of FIG. 2 may, for example, be performed during execution of the Scroll Bar Program Code with Pop-up Window and Quick Search Logic 18 shown in FIG. 1.

As shown in FIG. 2, at step 30 the disclosed system detects that the user has begun scrolling through a sorted list of entries using a scroll bar user interface object. For example, at step 30, the disclosed system detects that the user has clicked on a slider display object within a slide bar user interface object, using a button on the mouse, and continued to hold the button down. At step 32, in response to the detection at step 30, the disclosed system operates to display a pop-up window containing information from a list entry located at a current position. For example, the information in the pop-up window may be from an entry in the sorted list of entries that the user has previously clicked on.

At step 34, the disclosed system determines whether the user has released the slider display object within the scroll bar display object, for example by releasing the button on the mouse depressed at step 30. While the user continues to scroll through the sorted list of entries, moving the slider display object with the mouse button depressed, the disclosed system performs step 36, in which the contents of the pop-up window generated at step 32 is updated with information from the list entry at the current position in the sorted list indicated by the current position of the slider in the scroll bar display object. When the user releases the mouse button depressed at step 30, the disclosed system continues operation with step 38. At step 38, the disclosed system updates the user interface such that the list entry located at the new current position, as indicated by the position of the slider in the scroll bar display when the user released the mouse button, is made visually distinct (e.g. highlighted or outlined). The disclosed system next transitions from the Scroll Mode 26 to the Search Mode 28.

At step 40, the disclosed system maintains the pop-up window generated at step 32 for a relatively short, predetermined time period following the user releasing the mouse button. For example, the time period for which the disclosed system may maintain the pop-up window in the user interface after the user releases the mouse button may be only a few seconds. During the time the disclosed system maintains the pop-up window following release of the mouse button, the disclosed system waits for the user to click in the pop-up window in step 42. If the predetermined time period expires without the user clicking in the pop-up window, then the pop-up window is dismissed at step 44, and no longer displayed.

Otherwise, when the disclosed system detects the user clicking in the pop-up window at step 42 while in the Search Mode 28, a portion of the information in the pop-up window regarding the current list entry is made editable. Specifically, the portion of the pop-up window displaying information from the current list entry in the category on which the sorted list of entries is sorted becomes editable at step 46. In this way, the disclosed system begins to provide the user with a quick find capability based on text the user begins to type into the pop-up window.

When the user begins to edit the portion of the pop-up window displaying information from the current entry in the category on which the list is sorted, the disclosed system operates at step 48 to provide a list of selectable search suggestions for the user. The list of selectable search suggestions are, for example, made up of text from entries in the list matching the text entered by the user into the pop-up window. Specifically, the selectable search suggestions may contain portions of text from existing list entries, in the category on which the list is sorted. Such selectable search suggestions may be provided in the form of a drop down list or the like provided as "type ahead" options for the user to select from.

When the user selects one of the selectable search options provided at step 48, for example by clicking on one of the selectable search options, the disclosed system performs step 50. In step 50, the disclosed system operates to update the user interface to provide a new view of the sorted list, where the new view includes a new current entry found that matches the user selected search option. Additionally, the disclosed system operates at step 50 to make the new current entry visually distinct, e.g. by highlighting or outlining the new current entry.

Figure 3:
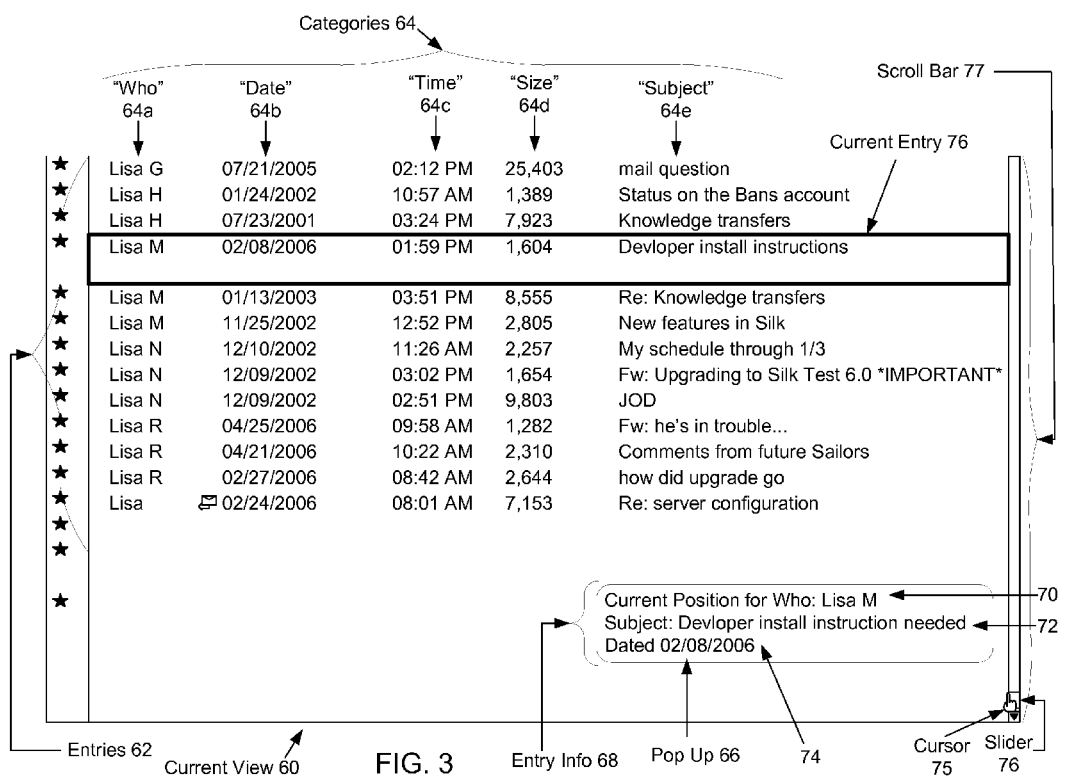
FIG. 3 is a screen shot showing an example of a current view of a sorted list of entries that is user navigable using a scroll bar user interface display object and a pop-up window generated by the disclosed system.

FIG. 3 is a screen shot showing an example of a Current View 60 of a sorted list of entries that is user navigable using a Scroll Bar User Interface Display Object 77 and a Pop-up Window 66 generated by an embodiment of the disclosed system. The Current View 60 is an example of the Scrolled Display of Sorted List with Scroll Bar Display Object 20 shown in FIG. 1, and the Pop-up Window 66 is an example of the Pop-up Window with Search Capabilities 22 shown in FIG. 1. The Current View 60 displays a number of Entries 62 that are contained in the sorted list of entries. Each of the Entries 62 may includes information associated with one or more of the Categories 64. The Categories 64 are shown including a "Who" category 64*a*, a "Date" category 64*b*, a "Time" category 64*c*, a "Size" category 6*d*, and a "Subject" category 64*e*. The Entries 62 may represent any specific type of data, such as e-mail messages, files, etc. In an embodiment in which the Entries 62 represent e-mail messages in a user's Inbox, the "Who" category 64*a* information for an entry is the sender of the message, the "Date" category 64*b* information for an entry is the date the message was received, the "Time" category 64*c* information for an entry is the time the message was received, the "Size" category 64*d* information for an entry is the size of the message, and the "Subject" category 64*e* information for an entry is the subject of the message.

The sorted list of entries may be sorted based on information from any one of the Categories 64. For example, as shown in FIG. 3, the sorted list of entries may be sorted alphabetically based on the "Who" category 64*a* information contained in the entries. The user may be able to indicate which of the Categories 64 the sorted list is to be sorted based on, for example through graphical buttons or other user interface display objects, and/or through setting of a personal preference setting or the like. The disclosed system determines which of the Categories 64 the sorted list of entries is sorted on, and operates based on this determination to enable searching for entries having matching information in that category while in Search Mode 28 shown in FIG. 2.

As further shown in FIG. 3, a Current Entry 76 has been highlighted so that it is visually distinguishable from the other displayed entries. For example, the Current Entry 76 may have been made current by the user previously clicking on it.

As a result of the user guiding the Cursor 75 over the Slider 76 within the Scroll Bar User Interface Display Object 77, and then clicking on the Slider 76, the disclosed system has generated the Pop-up Window 66. The Pop-up Window 66 is shown including Entry Information regarding the Current Entry 76. Specifically, the Entry Information 68 includes a line 70 displaying the "Who" category 64*a* information for the Current Entry 76, a line 72 displaying the "Subject" category 64*e* information for the Current Entry 76, and a line 74 displaying the "Date" category 64*b* information for the Current Entry 76. The disclosed system operates responsive to determining the category on which the sorted list is sorted on, in this case the "Who" category 64*a*, to provide the line 70 information from that category in the Current Entry 76 in a visually prominent way, e.g. at the top of the Entry Information 68 in the Pop-up Window 66.

After having clicked on the Slider 76, as shown in FIG. 3, the user then holds down the clicker button on the mouse and begins to move the Slider 76 within the Scroll Bar User Interface Display Object 77. As the user moves the Slider 76, the disclosed system updates the Entry Information 68 to contain information from a current entry indicated by the current position of the Slider 76 within the Scroll Bar User Interface Display Object 77. For example, as shown in FIG. 4, the user has moved the Slider 76 to a position within the Scroll Bar User Interface Display Object 77 corresponding the position of an entry in the sorted list representing a received e-mail message from a user "Don W", with a subject of "Need one more step", and received on May 3, 2004, as shown in the Pop-up Window 84 of FIG. 4. While the Entry Information 86 in the Pop-up Window 84 changes to dynamically reflect the changing current entry based on the position of the Slider 76 within the Scroll Bar User Interface Display Object 77 as the user scrolls through the sorted list, the Entries 82 displayed in the Current View 80 may not have been updated to also show the current entry. Accordingly, in the example of FIG. 4, the Current View 80 does not include the current entry representing a received e-mail message from "Don W" in the Entries 82, and that entry is accordingly not visible to the user. However, information from the current entry representing the e-mail message from "Don W" is advantageously provided by the disclosed system in the Entry Information 86 of the Pop-up Window 84.

FIG. 5 shows an example of a Current View 102 occurring when the user releases the mouse button and stops scrolling through the sorted list of entries using the Slider 76. As shown in FIG. 5, the Entries 102 have been updated to show the Current Entry 104, which represents the e-mail message received from "Don W" on Apr. 03, 2004. The Entry Information 86 in the Pop-up Window 84 continues to display information about the Current Entry 104, specifically a line 88 for the "Who" category information, a line 90 for the "Subject" category information, and a line 92 for the "Date" category information from the Current Entry 104. As a result of the user releasing the mouse button, the disclosed system enters the Search Mode 28 of FIG. 2. During search mode operation, the disclosed system continues to display the Pop-up Window 84 containing Entry Information 86 for some time period following the user releasing the mouse button. If the user does not click on the Pop-up Window 84 during this time period, the disclosed system causes the Pop-up Window 84 to be closed such that it is no longer displayed.

Further during search mode operation, the line of Entry Information 86 displaying information from the Current Entry 104 in the category on which the sorted list is sorted, in this case the "Who" category information displayed in line 88 of the Entry Information 86, becomes editable by the user. The user can edit that line of the Entry Information 86 to cause a search to be performed on the sorted list of entries for an entry having "Who" category information matching text entered or selected by the user. When such a matching entry is found, the disclosed system causes a new current view to be displayed containing the matching entry as a visually indicated current entry.

Figure 6:
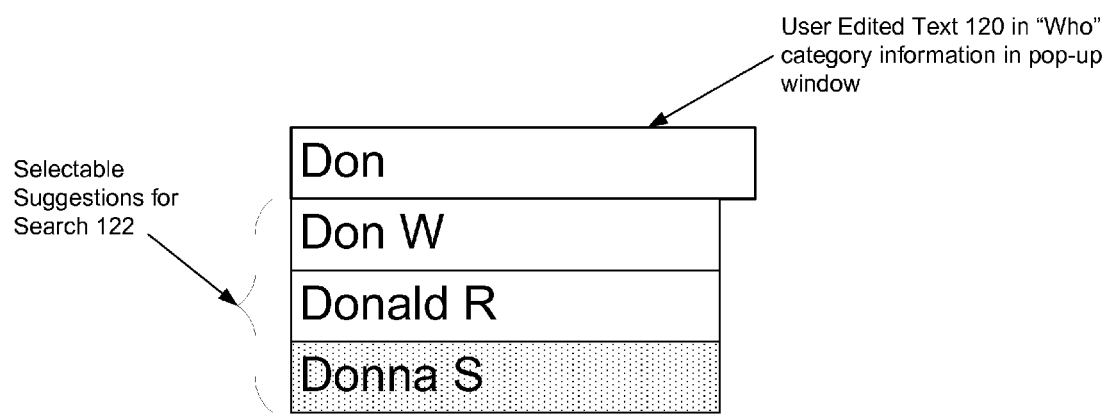
FIG. 6 shows a pull-down menu of selectable search options provided by an embodiment of the disclosed system in response to text provided by a user in the editable "Who" category information of a pop-up window provided by the disclosed system.

Further during search mode operation, in order to assist the user in finding matching entries, the disclosed system also includes a "type ahead" feature that provides multiple selectable search suggestions that are based on text entered by the user into line 88 of the Entry Information 86. For example, as shown in FIG. 6, if the user has either entered the text 120, or has simply deleted the "W" from line 88, the disclosed system would automatically provide the Selectable Suggestions for Search 122 as a pull down list beneath line 88 in the Entry Information 86. Each of the entries in the Selectable Suggestions for Search 122 contains text in the category being searched (e.g. "Who") from an existing entry in the sorted list. Accordingly, the user can select from the search options "Don W", "Donald R.", and "Donna S", each of which are contained in a corresponding entry within the sorted list. In this way the disclosed system enables a user to quickly find entries in the sorted list by triggering a search (e.g. hitting "Enter") after selecting one of the Selectable Suggestions for Search 122 (e.g. by clicking on the desired one of the Selectable Suggestions for Search 122.

Figure 7:
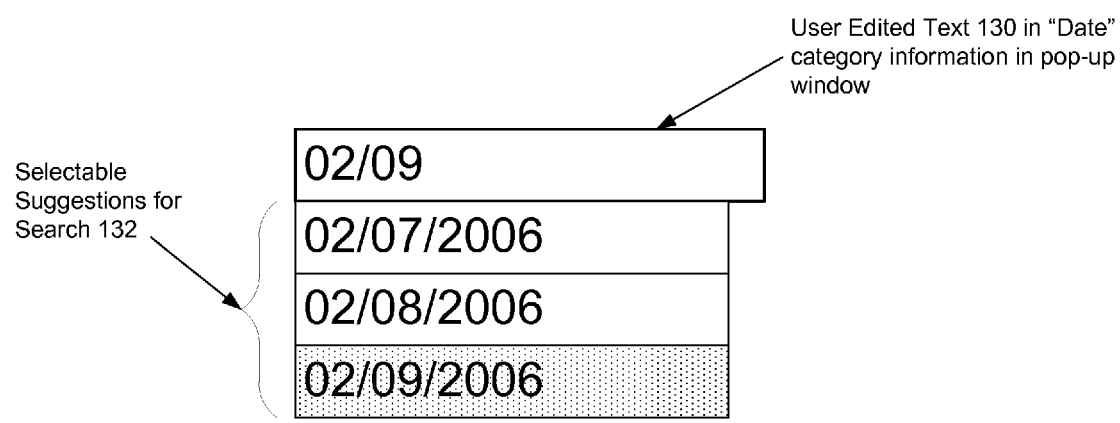
FIG. 7 shows a pull-down menu of selectable search options provided by an embodiment of the disclosed system in response to text provided by a user in the editable "Date" category information of a pop-up window provided by the disclosed system.
Figure 8:
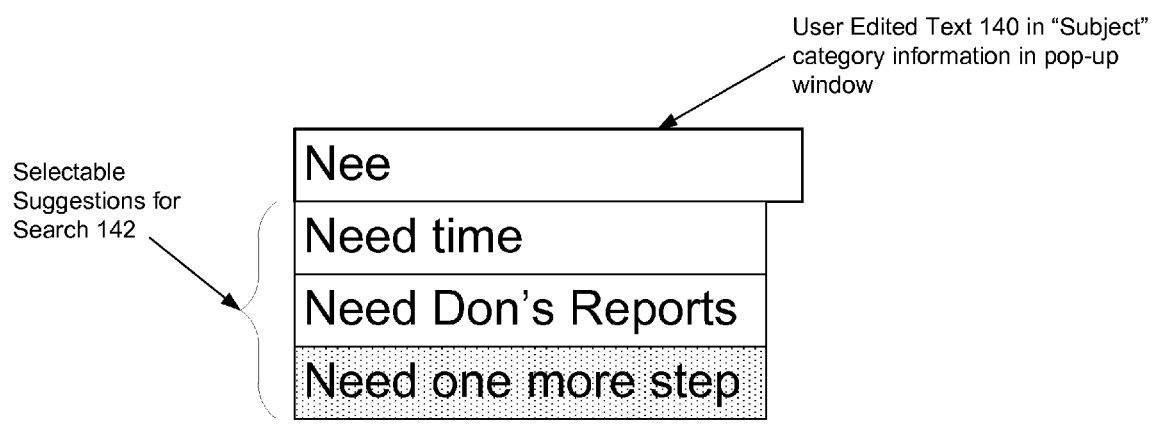
FIG. 8 shows a pull-down menu of selectable search options provided by an embodiment of the disclosed system in response to text provided by a user in the editable "Subject" category information of a pop-up window provided by the disclosed system.

While the example of FIG. 6 is with regard to a use case in which the sorted list of entries is sorted based on information in the "Who" category within the sorted entries, the present system is not limited to such operation. Accordingly, if the sorted list of entries were sorted based on any other specific category, then the editable information in the pop-up window provided by the disclosed system would contain information form the current entry in that category, and accordingly the selectable suggestions for search provided by the disclosed system would also be in that category. For example, as shown in FIG. 7, if the sorted list were sorted based on information contained in the "Date" category within the sorted entries, then User Edited Text 130 in the "Date" category information of the pop-up window would cause the disclosed system to generate the Selectable Suggestions for Search 132 as a drop down list under the appropriate line within the Entry Information 86. Similarly, if the sorted list were sorted based on information contained in the "Subject" category information within the sorted entries, then the User Edited Text 140 in the "Subject" category information of the pop-up window would cause the disclosed system to generate the Selectable Suggestions for Search 142 shown in FIG. 8 as a drop down list under the appropriate line within the Entry Information 86.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for enabling user navigation of a sorted list of entries, comprising:

generating, responsive to a user clicking on a slider display object within a scroll bar display object in a user interface, a pop-up window displaying information from at least one category in a currently selected list entry within said sorted list of entries, wherein said at least one category includes a category based on which said sorted list of entries is currently sorted; and responsive to said user moving said slider display object within said scroll bar display object, updating said information displayed in said pop-up window to reflect the contents of a list entry located at a current location in said sorted list of entries, wherein said current location reflects a current location of said slider display object within said scroll bar display object while said user is moving said slider display object within said scroll bar display object;

determining that said user has stopped moving said slider display object within said scroll bar display object;

entering, responsive to said determining that said user has stopped moving said slider display object within said scroll bar display object, a search mode, wherein said search mode provides said user with the ability to edit text in said pop-up window; and performing a search across said sorted list of entries based on said text edited by said user in said pop-up window.

2. The method of claim 1, further comprising:

continuing to display said pop-up window in said search mode for a predetermined period of time following said determining that said user has stopped moving said slider display object within said scroll bar display object, and then stopping said displaying of said pop-up window in the event that said user does not click on said pop-up during said predetermined period of time.

3. The method of claim 2, further comprising:

during said search mode, and responsive to said user typing at least one character into said pop-up window, displaying a set of suggested selectable search options matching category information in corresponding existing ones of said sorted list of entries and including said at least one character typed by said user; and performing said search across said sorted list of entries responsive to said user selecting one of said suggested selectable search options.

4. The method of claim 3, further comprising:

wherein said performing said search across said sorted list of entries responsive to said user selecting on of said suggested selectable search options includes updating said current location in said sorted list of entries to a location of one of said sorted list of entries including said user selected one of said suggested selectable search options.

5. The method of claim 4, further comprising:

determining which of a plurality of categories said sorted list of entries is sorted based on; and wherein said search mode provides said user with the ability to edit text in said pop-up window only with regard to said one of said plurality of categories said sorted list of entries is sorted based on.

6. The method of claim 5, further comprising:

determining which of a plurality of categories said sorted list of entries is sorted based on; and arranging a list of information displayed in said pop-up window such that information regarding said one of said plurality of categories said sorted list of entries is sorted based on is located at the top of said list of information displayed in said pop-up window.

7. The method of claim 6, wherein each entry in said sorted list of entries represents a corresponding one of a plurality of electronic mail messages stored in an electronic mail system.

8. A system including a computer readable storage medium, said computer readable storage medium having stored thereon program code for providing user navigation of a sorted list of entries, said program code comprising:

program code for generating, responsive to a user clicking on a slider display object within a scroll bar display object in a user interface, a pop-up window displaying information from at least one category in a currently selected list entry within said sorted list of list entries, wherein said at least one category includes a category based on which said sorted list of entries is currently sorted; and program code for, responsive to said user moving said slider display object within said scroll bar display object, updating said information displayed in said pop-up window to reflect the contents of a list entry located at a current location in said sorted list of entries, wherein said current location reflects a current location of said slider display object within said scroll bar display object while said user is moving said slider display object within said scroll bar display object;

program code for determining that said user has stopped moving said slider display object within said scroll bar display object;

program code for entering, responsive to said determining that said user has stopped moving said slider display object within said scroll bar display object, a search mode, wherein said search mode provides said user with the ability to edit text in said pop-up window; and program code for performing a search across said sorted list of entries based on said text edited by said user in said pop-up window.

9. The system of claim 8, said program code further comprising:

program code for continuing to display said pop-up window in said search mode for a predetermined period of time following said determining that said user has stopped moving said slider display object within said scroll bar display object, and then stopping said displaying of said pop-up window in the event that said user does not click on said pop-up during said predetermined period of time.

10. The system of claim 9, said program code further comprising:

program code for, during said search mode, and responsive to said user typing at least one character into said pop-up window, displaying a set of suggested selectable search options matching category information in corresponding existing ones of said sorted list of entries and including said at least one character typed by said user; and performing said search across said sorted list of entries responsive to said user selecting one of said suggested selectable search options.

11. The system of claim 10, said program code further comprising:

wherein said program code for performing said search across said sorted list of entries is responsive to said user selecting on of said suggested selectable search options includes updating said current location in said sorted list of entries to a location of one of said sorted list of entries including said user selected one of said suggested selectable search options.

12. The system of claim 11, said program code further comprising:

program code for determining which of a plurality of categories said sorted list of entries is sorted based on; and program code for, during said search mode, providing said user with the ability to edit text in said pop-up window only with regard to said one of said plurality of categories said sorted list of entries is sorted based on.

13. The system of claim 12, said program code further comprising:

determining which of a plurality of categories said sorted list of entries is sorted based on; and arranging a list of information displayed in said pop-up window such that information regarding said one of said plurality of categories said sorted list of entries is sorted based on is located at the top of said list of information displayed in said pop-up window.

14. The system of claim 13, wherein each entry in said sorted list of entries represents a corresponding one of a plurality of electronic mail messages stored in an electronic mail system.

15. A computer program product including a computer readable storage medium, said computer readable storage medium having stored thereon program code for providing user navigation of a sorted list of entries, said program code comprising:

program code for generating, responsive to a user clicking on a slider display object within a scroll bar display object in a user interface, a pop-up window displaying information from at least one category in a currently selected list entry within said sorted list of list entries, wherein said at least one category includes a category based on which said sorted list of entries is currently sorted; and program code for, responsive to said user moving said slider display object within said scroll bar display object, updating said information displayed in said pop-up window to reflect the contents of a list entry located at a current location in said sorted list of entries, wherein said current location reflects a current location of said slider display object within said scroll bar display object while said user is moving said slider display object within said scroll bar display object;

program code for determining that said user has stopped moving said slider display object within said scroll bar display object;

program code for entering, responsive to said determining that said user has stopped moving said slider display object within said scroll bar display object, a search mode, wherein said search mode provides said user with the ability to edit text in said pop-up window; and program code for performing a search across said sorted list of entries based on said text edited by said user in said pop-up window.

16. A system including a computer readable storage medium, said computer readable storage medium having stored thereon program code for providing user navigation of a sorted list of entries, said program code comprising:

means for generating, responsive to a user clicking on a slider display object within a scroll bar display object in a user interface, a pop-up window displaying information from at least one category in a currently selected list entry within said sorted list of list entries, wherein said at least one category includes a category based on which said sorted list of entries is currently sorted; and means for, responsive to said user moving said slider display object within said scroll bar display object, updating said information displayed in said pop-up window to reflect the contents of a list entry located at a current location in said sorted list of entries, wherein said current location reflects a current location of said slider display object within said scroll bar display object while said user is moving said slider display object within said scroll bar display object;

means for determining that said user has stopped moving said slider display object within said scroll bar display object;

means for entering, responsive to said determining that said user has stopped moving said slider display object within said scroll bar display object, a search mode, wherein said search mode provides said user with the ability to edit text in said pop-up window; and means for performing a search across said sorted list of entries based on said text edited by said user in said pop-up window.

* * * * *